United States Patent [19]
Andre

[11] 3,712,116
[45] Jan. 23, 1973

[54] METHOD AND APPARATUS FOR DETECTING LIQUID COMPOSITIONS BY THERMAL CONDUCTIVITY

[75] Inventor: Marshall L. Andre, Houston, Tex.

[73] Assignee: Shell Oil Company, Houston, Tex.

[22] Filed: Nov. 25, 1970

[21] Appl. No.: 92,790

[52] U.S. Cl. ................................. 73/53, 73/61.1 R
[51] Int. Cl. ............................................. G01n 25/18
[58] Field of Search .......................... 73/53, 61.1 R

[56] References Cited

UNITED STATES PATENTS

| | | | |
|---|---|---|---|
| 3,354,052 | 11/1967 | Williams | 73/53 X |
| 2,828,479 | 3/1958 | Jackson, Jr. | 73/53 UX |
| 2,780,094 | 2/1957 | Fink | 73/53 |
| 3,548,637 | 12/1970 | Wicks | 73/53 |

FOREIGN PATENTS OR APPLICATIONS

| | | | |
|---|---|---|---|
| 924,896 | 5/1963 | Great Britain | 73/53 |
| 975,887 | 11/1964 | Great Britain | 73/53 |

*Primary Examiner*—Louis J. Capozi
*Assistant Examiner*—Joseph W. Roskos
*Attorney*—H. L. Denkler and T. E. Bieber

[57] ABSTRACT

Liquid/liquid interfaces and changes in bulk-liquid composition may be detected by changes in thermal conductivity. A pair of thermistors are located, one in the reference side and the other in the sample side of a cell. A reference solvent is caused to flow through the reference side of the cell while the liquid to be tested is caused to flow through the sample side of the cell. The thermistors are integrated into a bridge circuit such that a change in liquid composition unbalances the bridge causing an output signal that may be recorded on a strip chart.

5 Claims, 5 Drawing Figures

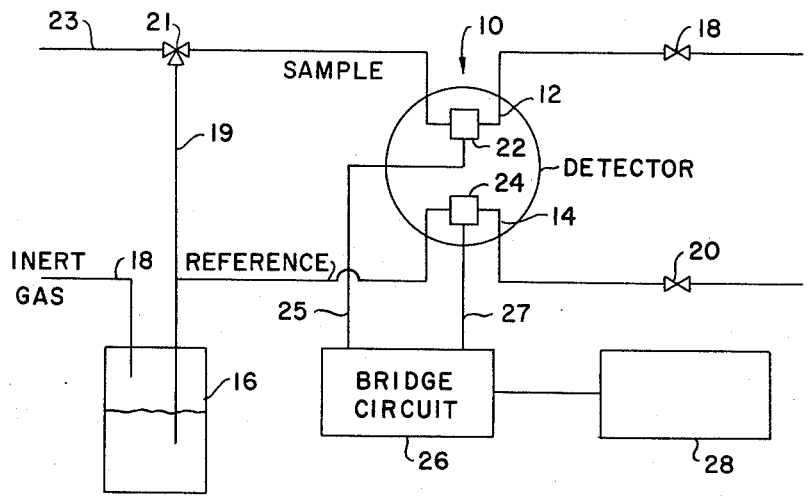
FIG. I
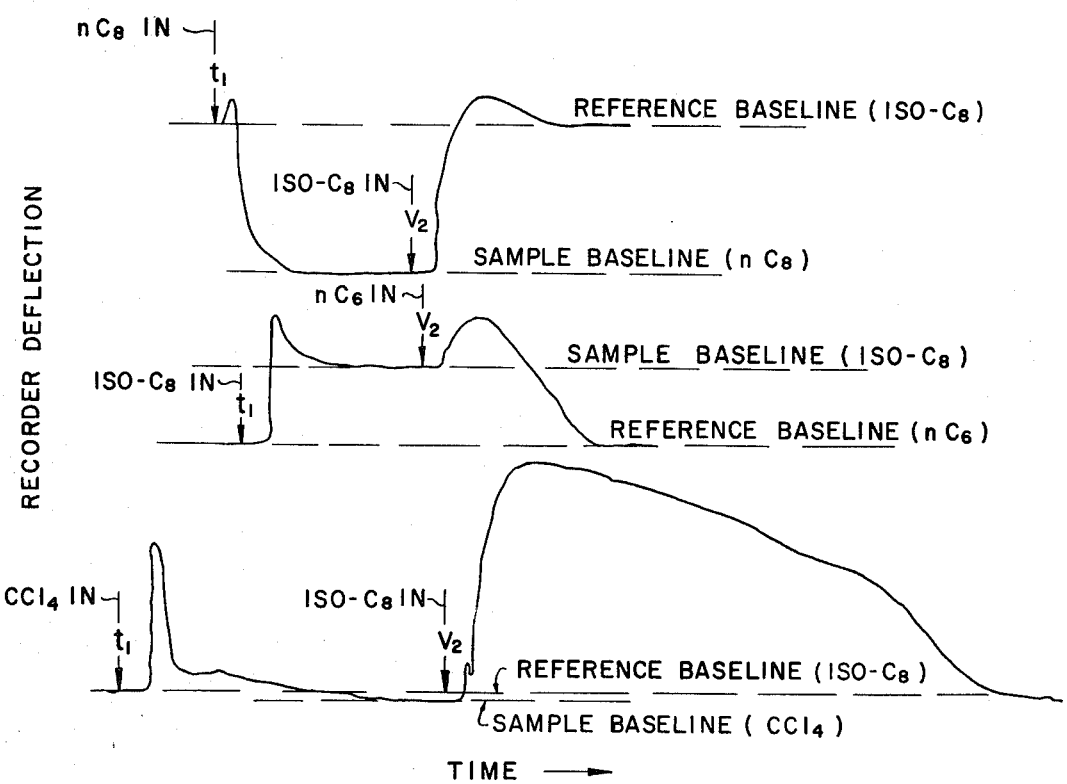
FIG. 2
INVENTOR:
M. L. ANDRE'

INVENTOR:
M. L. ANDRE'

METHOD AND APPARATUS FOR DETECTING LIQUID COMPOSITIONS BY THERMAL CONDUCTIVITY

BACKGROUND OF THE INVENTION

This invention relates to the detection of liquid interfaces and changes in bulk liquid composition. More particularly, it relates to the use of thermal conductivity cells in the measurement thereof.

Thermal conductivity cells are widely used to detect changes in gas composition due to the substantial changes in thermal conductivity accompanying a compositional change. Thermal conductivity cells, however, have not been used to detect changes in liquid composition since thermal conductivities of liquids are not widely different. It has been found unexpectedly that thermal conductivity cells employing thermistors as sensors are sufficiently sensitive to detect changes in liquid composition, and if properly interpreted, can be used to detect liquid-liquid interfaces and changes in bulk-liquid composition. Furthermore, this invention does not suffer from some of the disadvantages associated with such other liquid-liquid detectors as those based on refractive index changes and ultraviolet absorptivity. The present invention is not sensitive to small temperature changes that are troublesome with refractive index devices, and the present invention is very effective with all hydrocarbons (as well as non-hydrocarbons) while ultraviolet detectors are notoriously insensitive to saturated hydrocarbons. In addition, the apparatus of the present invention is simple, rugged and inexpensive while its sensitivity is comparable to that of other detectors.

The present invention can be expected to find wide use as a pipeline interface detector as well as an analytical tool. A further use of the invention is in monitoring the eluent from liquid elution chromatography. The invention may also be used to eliminate guess work in collection of fractions. In large scale operations, where recovery of fractions is desired, a slip stream from a chromatographic column can be routed through the invention, and an elution can be easily detected. The invention may also be used to determine liquid density of unknown samples and also to approximate the thermal conductivity of unknown samples.

SUMMARY OF THE INVENTION

In brief, the invention includes a cell having two independent flow paths with means for causing a sample liquid to flow through one path and means for causing a reference liquid to flow through the other path. A pair of matched thermistors is positioned in the cell — one in each flow path. The thermistors are incorporated into an electrical bridge such that the bridge is balanced when both flow paths contain a liquid with the same composition. An output device such as a strip chart recorder is connected to the bridge circuit and records imbalances therein.

BRIEF DESCRIPTION OF THE DRAWING

FIG. 1 is a block diagram of the entire system;

FIG. 2 illustrates the response of the system to various solvent pairs;

DESCRIPTION OF THE PREFERRED EMBODIMENT

Figure 3:
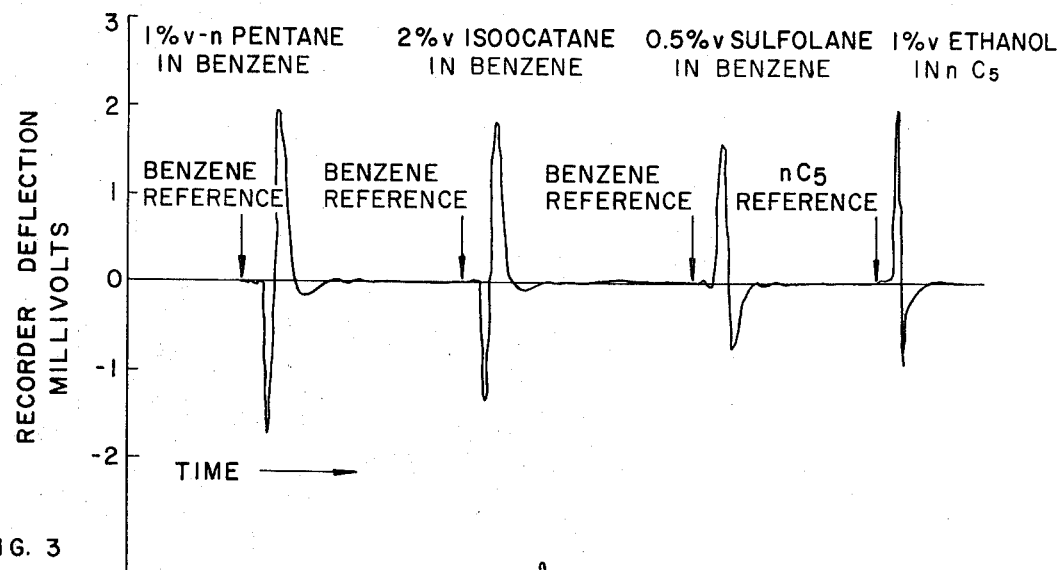
FIG. 3 illustrates the response of the system to abrupt changes in liquids.

Referring now to FIG. 1, there is shown a flowthrough cell 10 having a pair of straight-through flow paths 12 and 14. Typically a Carle Instruments Model 100 might be used for the cell 10. A sample liquid is caused to flow through path 12 and a reference liquid through path 14. A reservoir of reference liquid 16 is provided for this purpose and in this case is caused to flow through cell 10 by inert gas pressure applied through pipe 18. Means for introducing the reference liquid into sample flow path 12 are provided by flow path 19 and valve 21. The sample liquid is introduced into the system via flow path 23. Liquid flow through cell 10 is controlled by two micrometer metering valves 18 and 20 located down stream of the cell. Two matched glass-coated thermistors 22 and 24 are located one each in flow streams 12 and 14 respectively and operate as the sensing elements of the cell and are incorporated into a conventional bridge circuit 26 by leads 25 and 27 such that the bridge is balanced when the same liquid is flowing through both sides of cell 10. But, when a liquid with a different conductivity passes through sample flow path 12, bridge circuit 26 is unbalanced and an output signal is generated and recorded on a suitable output device 28 such as a strip chart recorder.

A typical response of the system for three different solvent pairs is shown in FIG. 2. In FIG. 2a, reference solvent was isooctane (iso-$C_2$) and the sample solvent was n-octane (n $C_8$). In FIG. 2b the reference base line n-hexane (n $C_6$) and the sample solvent was iso-$C_8$. And in 2c, the reference solvent was iso-$C_8$ and the sample solvent was carbontetrachloride ($CCl_4$). In each of the three examples, a base line for the reference solvent was first established with reference solvent flowing through both sides of cell 10. That is, valve 21 was opened so that reference solvent from reservoir 16 flowed through flow paths 12 and 14. At time $t_1$, sample solvent was introduced into the sample side of cell 10 only (with reference solvent still flowing through flow path 14.) A new base line was established. The difference between the two base lines was taken as $\Delta s$, where $\Delta s$ is a function of heat transfer from thermistors 22 and 24. The heat transfer mechanism is largely convective and as such is a function of physical and fluid properties such as viscosity ($\mu$), heat capacity ($C_p$), and density ($\delta$). Empirically it has been observed that the convection heat transfer, $\Delta k$, takes the following form;

$$\Delta k = A \Delta S + B \log (C_{p_s} \mu_s / C_{p_u} \mu_u)$$

where A and B are constants that vary with cell current and thermistor characteristics and the subscripts $u$ and $s$ refer to unknown and standard (reference) respectively.

Calculation of the thermal conductivity of various liquids from experimental data from the equation $$k_u = k_s + A\Delta S + B \log(Cp_s\mu_s/Cp_u\mu_u)$$

gives good agreement with literature values for both hydrocarbons and nonhydrocarbons. By this method it is therefore possible to measure the thermal conductivity of a liquid.

FIG. 3 illustrates the response of the system to abrupt changes in liquid as might be experienced at a pipeline interface. FIG. 3a resulted by using a benzene reference and injecting 1 microliter of a solution of benzene and 1 percent pentane. FIG. 3b resulted from a benzene reference and an injected sample liquid of pure benzene and benzene with a 2 percent isooctane solute. FIG. 3c resulted from the use of benzene as a reference and the sample liquid interface being pure benzene on one side and benzene with a 0.5 percent sulfolane solute on the other and FIG. 3d resulted with a $nC_5$ reference and a sample liquid having an interface of pure $nC_5$ on one side and $nC_5$ with a 1 percent ethanol solute on the other. The solvent flow rate was roughly 40 microliters per minute. It can be seen from FIG. 3 that even interfaces involving very small concentrations of solute produce substantial deflections on the strip chart recorder 28 so that pipeline interfaces could be easily detected.

Figure 4:
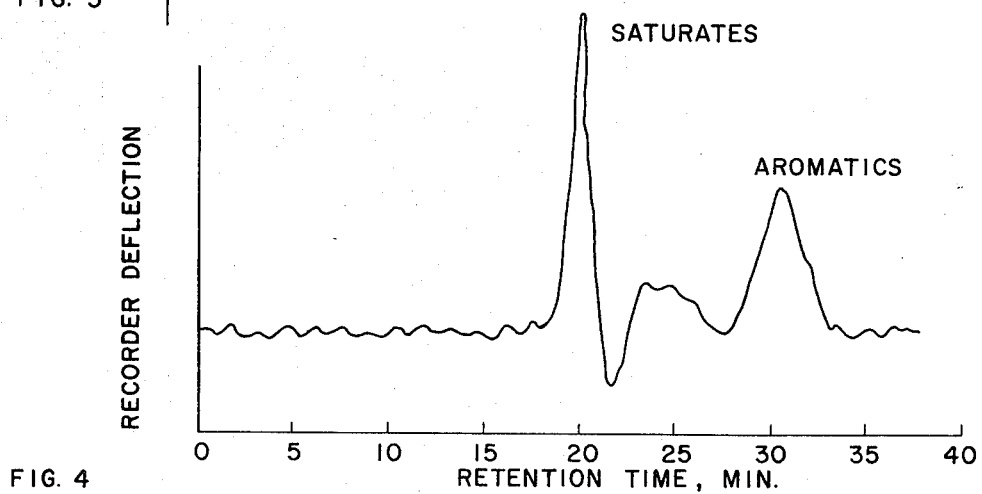
FIG. 4 illustrates the application of the system to microscale separations.

FIG. 4 shows the application of the present invention to microscale separations. In this example, useful information is derived from chromatographic analysis of only 0.4 microliters of kerosene. A 0.04 inch × 30 inch F20 alumina column with a 5 percent benzene in isooctane developer was used. This developer was introduced to the chromatographic column as well as to the reference side of the detector. Effluent from the column was introduced into sample flow path 23. The presence of eluted oil in the sample flow path 12 caused unbalance of the bridge circuit. The output signal displayed on a strip chart recorder showed essentially complete separation of saturates from aromatics.

Figure 5:
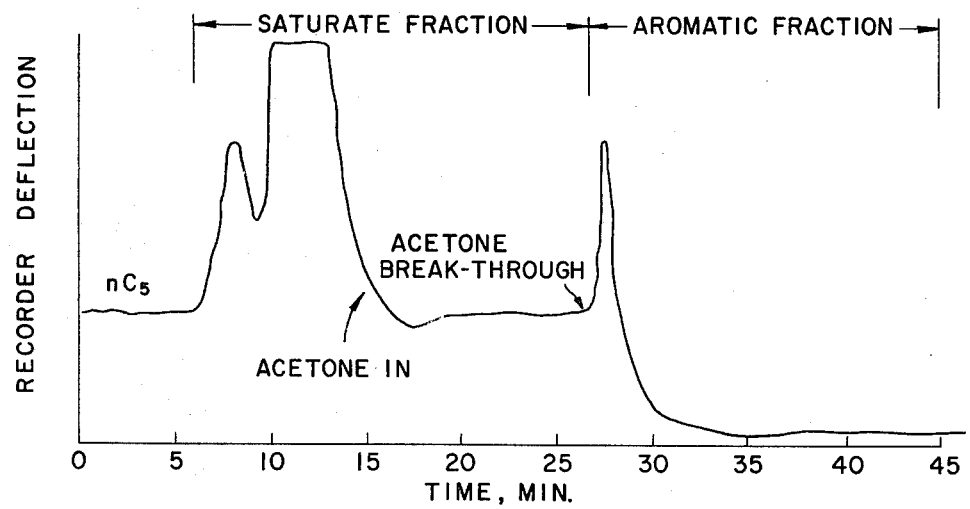
FIG. 5 shows the application of the system to large scale separations.

In prepatory scale chromatography, where recovery of fractions is desired, a slip stream from a column can be routed through the detector cell 10. FIG. 5 shows the separation of nonaromatics from aromatics in a high-boiling oil over a bauxite/silica gel column where the object is to recover pure nonaromatic, i.e., a fraction free of aromatics, and an aromatic fraction which contains essentially no saturates. The output signal from the detector increases as the pentane eluted nonaromatic fraction passes through the detector. When the signal returns to its original value recovery of nonaromatics is essentially complete. The aromatic component is then displaced from the column by a more polar solvent. The detector signal indicates progress of aromatic removal. When the signal reaches a steady state, recovery of the aromatic fraction has been achieved.

I claim as my invention:

1. A system for detecting changes in liquid composition by detecting changes in the thermal conductivity of a liquid while said liquid is in a liquid state, said system comprising;
   a first and second liquid flow path means;
   a source of reference liquid connected to said first flow path means;
   a source of sample liquid connected to said second flow path means;
   means for causing said reference and sample liquids to flow through their respective flow path means;
   flow control means disposed in said first and second flow path means for controlling the flow of liquid therethrough;
   first and second thermistors, said first thermistor disposed in said first flow path means and said second thermistor disposed in said second flow path means;
   electrical bridge means having said first and second thermistors integrated into said bridge such that said bridge is balanced with liquids of the same thermal conductivity flowing through both of said first and second flow path means and said bridge is unbalanced and thereby generates an electrical output signal when liquids having different thermal conductivities flow respectively through said first and second flow path means; and
   output display means operatively connected to said bridge means for making the electrical output signal of said bridge means visible.

2. The system of claim 1 further characterized by valve means interconnecting said source of reference liquid and said second flow path means whereby either reference liquid or sample liquid may be passed through said second flow path means.

3. The apparatus of claim 1 wherein said first liquid flow path means comprises a pipeline.

4. The apparatus of claim 1 wherein said first liquid flow path means is connected to a chromatographic column so that the effluent therefrom flows through said first liquid flow path; and,
   the source of reference liquid associated with said first flow path means is connected to said chromatographic column.

5. A method of detecting changes in liquid composition by detecting changes in thermal conductivity, said method comprising the steps of;
   passing a reference liquid through a flow cell having two independent flow paths, said cell having a thermistor disposed in each of said flow paths;
   balancing a bridge circuit of which said thermistors form an integral part while said reference liquid is flowing through said flow paths;
   introducing a sample liquid into one of said flow paths; and
   recording the output of said bridge circuit, said bridge being balanced when the same liquid is passing through both of said flow paths and unbalanced when a liquid having a different conductivity from the reference liquid flows through one of said flow paths.

* * * * *